US012187399B2

(12) United States Patent
Hara et al.

(10) Patent No.: US 12,187,399 B2
(45) Date of Patent: Jan. 7, 2025

(54) MARINE PROPULSION DEVICE WITH FORWARD/REVERSE SHIFTING MECHANISM, AND MARINE VESSEL

(71) Applicant: YAMAHA HATSUDOKI KABUSHIKI KAISHA, Iwata (JP)

(72) Inventors: Ryosuke Hara, Shizuoka (JP); Hiroki Sato, Shizuoka (JP)

(73) Assignee: YAMAHA KATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 18/095,009

(22) Filed: Jan. 10, 2023

(65) Prior Publication Data

US 2023/0264798 A1 Aug. 24, 2023

(30) Foreign Application Priority Data

Feb. 21, 2022 (JP) ................................ 2022-024652

(51) Int. Cl.
*B63H 21/21* (2006.01)
*F02D 41/00* (2006.01)

(52) U.S. Cl.
CPC ....... *B63H 21/213* (2013.01); *F02D 41/0002* (2013.01); *B63H 2021/216* (2013.01); *F02D 2200/10* (2013.01); *F02D 2200/501* (2013.01)

(58) Field of Classification Search
CPC ..... B63H 21/14; B63H 21/213; F02B 61/045; F02D 31/002; F02D 31/005; F16H 63/50
See application file for complete search history.

(56) References Cited

U.S. PATENT DOCUMENTS

| | | | | |
|---|---|---|---|---|
| 6,015,319 A | 1/2000 | Tanaka | |
| 6,102,755 A * | 8/2000 | Hoshiba | B63H 21/213 440/86 |
| 9,248,898 B1 * | 2/2016 | Kirchhoff | B63H 25/42 |
| 10,059,417 B1 * | 8/2018 | Hilbert | B63H 21/213 |
| 2018/0057132 A1 * | 3/2018 | Ward | B63H 21/213 |
| 2020/0140052 A1 * | 5/2020 | Derginer | B63H 25/02 |
| 2022/0374015 A1 * | 11/2022 | Ikegaya | B63B 79/40 |
| 2023/0373607 A1 * | 11/2023 | Hamada | B63H 20/12 |

FOREIGN PATENT DOCUMENTS

| | | |
|---|---|---|
| JP | 10-176560 A | 6/1998 |
| JP | 2018-90055 A | 6/2018 |

* cited by examiner

*Primary Examiner* — John Kwon
(74) *Attorney, Agent, or Firm* — Keating & Bennett, LLP

(57) ABSTRACT

A propulsion device for a marine vessel includes an engine and a forward/reverse shifting mechanism. The direction of a propulsive force generated by the propulsion device is changed according to a shift position of the forward/reverse shifting mechanism. The shift position is changeable between a forward position and a reverse position via a neutral position. In response to a command signal based on an operation of a joystick or an operator, the shift position of the forward/reverse shifting mechanism and the engine are controlled. When the shift position of the forward/reverse shifting mechanism is changed from the neutral position to a position corresponding to a direction opposite to a travelling direction of the marine vessel, which is determined based on the speed of the marine vessel, a correction control is performed to increase an output of the engine based on the speed of the marine vessel.

14 Claims, 9 Drawing Sheets

MARINE PROPULSION DEVICE WITH FORWARD/REVERSE SHIFTING MECHANISM, AND MARINE VESSEL

CROSS REFERENCE TO RELATED APPLICATIONS

This application claims the benefit of priority to Japanese Patent Application No. 2022-024652 filed on Feb. 21, 2022. The entire contents of this application are hereby incorporated herein by reference.

BACKGROUND OF THE INVENTION

1. Field of the Invention

The present invention relates to marine propulsion devices and marine vessels.

2. Description of the Related Art

There are known techniques for preventing an engine stall which is caused when a shift position in a propulsion device like an outboard motor has switched to a forward position or reverse position mainly for the purpose of braking a marine vessel that is sailing, as disclosed in Japanese Laid-open Patent Publication (Kokai) No. 2018-90055 and Japanese Laid-open Patent Publication (Kokai) No. H10-176560. For example, Japanese Laid-open Patent Publication (Kokai) No. H10-176560 discloses a control apparatus that increases the flow rate of air entering an engine (intake airflow rate of the engine) for a predetermined period of time starting from a time point when the shift position of the outboard motor is switched to the forward or reverse position according to an operation of a lever or immediately before the time point.

Cases where an engine stalls due to switching of the shift position arise not only when a marine vessel needs to be braked. For example, in a marine vessel including two or more propulsion devices, control units in the propulsion devices independently control the respective shift positions and engine outputs in accordance with commands. Particularly in an operation mode using a joystick, the propulsion devices are independently required to successively change their respective shift positions and engine outputs.

When the marine vessel is turning around, there may be a case where one or more of the propulsion devices are caused to generate respective propulsive forces and the others are caused to generate no propulsive force with their shift positions being neutral positions. When the marine vessel moves laterally, there may be another case where the shift positions in one or more of the propulsion devices and those in the other propulsion devices are set in the opposite directions.

Focusing on a case where a first propulsion device is generating a forward propulsive force and the shift position of a second propulsion device is the neutral position, a propeller of the second propulsion device is turned in a forward direction together with a water current generated by the marine vessel that is sailing. Thus, when the second propulsion device, whose shift position is continuing to be the neutral position, is requested to generate a reverse propulsive force via a vessel operator's operation on the joystick, the control unit in the second propulsion device switches the shift position to the reverse position. It requires the propeller to turn in a reverse direction, which is opposite to the direction (forward direction) in which the propeller is currently turning together with the water current. As a result, the engine is subjected to a heavy load along with a shift shock, which may cause an engine stall. Such a situation may frequently arise particularly in the operation mode using a joystick.

SUMMARY OF THE INVENTION

According to a preferred embodiment of the present invention, a propulsion device for a marine vessel includes an engine and a forward/reverse shifting mechanism to change a direction of a propulsive force to be generated by the propulsion device according to a shift position thereof. The shift position is changeable between a forward position and a reverse position via a neutral position. The propulsion device further includes a controller configured or programmed to obtain a command signal based on an operation of a joystick provided in the marine vessel, and based on the obtained command signal, control the shift position of the forward/reverse shifting mechanism and control the engine. The controller is further configured or programmed to determine a travelling direction of the marine vessel based on the obtained speed of the marine vessel, and when changing the shift position of the forward/reverse shifting mechanism from the neutral position to a position corresponding to a direction opposite to the determined travelling direction of the marine vessel, perform a correction control to increase an output of the engine based on the obtained speed of the marine vessel.

According to a preferred embodiment of the present invention, a marine vessel includes a hull, a joystick, and the above-described propulsion device attached to the hull.

According to a preferred embodiment of the present invention, a marine vessel includes a hull, an operator, a propulsion device attached to the hull, and a controller. The propulsion device includes an engine and a forward/reverse shifting mechanism to change a direction of a propulsive force to be generated by the propulsion device according to a shift position thereof. The shift position is changeable between a forward position and a reverse position via a neutral position. The controller is configured or programmed to obtain a command signal based on an operation of the operator, and based on the obtained command signal, control the shift position of the forward/reverse shifting mechanism and control the engine. The controller is further configured or programmed to obtain a speed of the marine vessel, determine a travelling direction of the marine vessel based on the obtained speed of the marine vessel, and when changing the shift position of the forward/reverse shifting mechanism from the neutral position to a position corresponding to a direction opposite to the determined travelling direction of the marine vessel, perform a correction control to increase an output of the engine based on the obtained speed of the marine vessel.

According to a preferred embodiment of the present invention, a marine vessel includes a hull, an operator, a plurality of propulsion devices attached to the hull, and a controller. Each of the plurality of propulsion devices includes an engine and a forward/reverse shifting mechanism to change a direction of a propulsive force to be generated by the propulsion device according to a shift position thereof. The shift position is changeable between a forward position and a reverse position via a neutral position. The controller is configured or programmed to obtain a command signal based on an operation of the operator, and based on the obtained command signal, control the shift positions of the forward/reverse shifting mechanisms of the plurality of propulsion devices and control the engines of the plurality of propulsion devices. The controller is further configured or programmed to obtain a speed of the marine vessel, determine a travelling direction of the marine vessel based on the obtained speed of the marine vessel, and perform a correction control on one or more propulsion devices whose shift positions of the respective forward/reverse shifting mechanisms are the neutral positions among the plurality of propulsion devices. In the correction control, the controller is configured or programmed to increase outputs of the engines of the one or more propulsion devices based on the obtained speed of the marine vessel when changing the shift positions of the respective forward/reverse shifting mechanisms from the neutral positions to respective positions corresponding to a direction opposite to the determined travelling direction of the marine vessel.

According to these configurations, a command signal based on an operation of the joystick or operator is obtained, and forward/reverse shifting in the propulsion device (the shift position of the forward/reverse shifting mechanism) and the engine is controlled based on the command signal. The speed of the marine vessel is obtained, and the travelling direction of the marine vessel is determined based on the obtained speed of the marine vessel. When the shift position of the forward/reverse shifting mechanism is changed from the neutral position to a position corresponding to a direction opposite to the determined travelling direction of the marine vessel, the correction control is performed to increase the output of the engine based on the obtained speed of the marine vessel. This prevents an engine stall when shifting from the neutral position to a position corresponding to a direction opposite to the travelling direction of the marine vessel.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
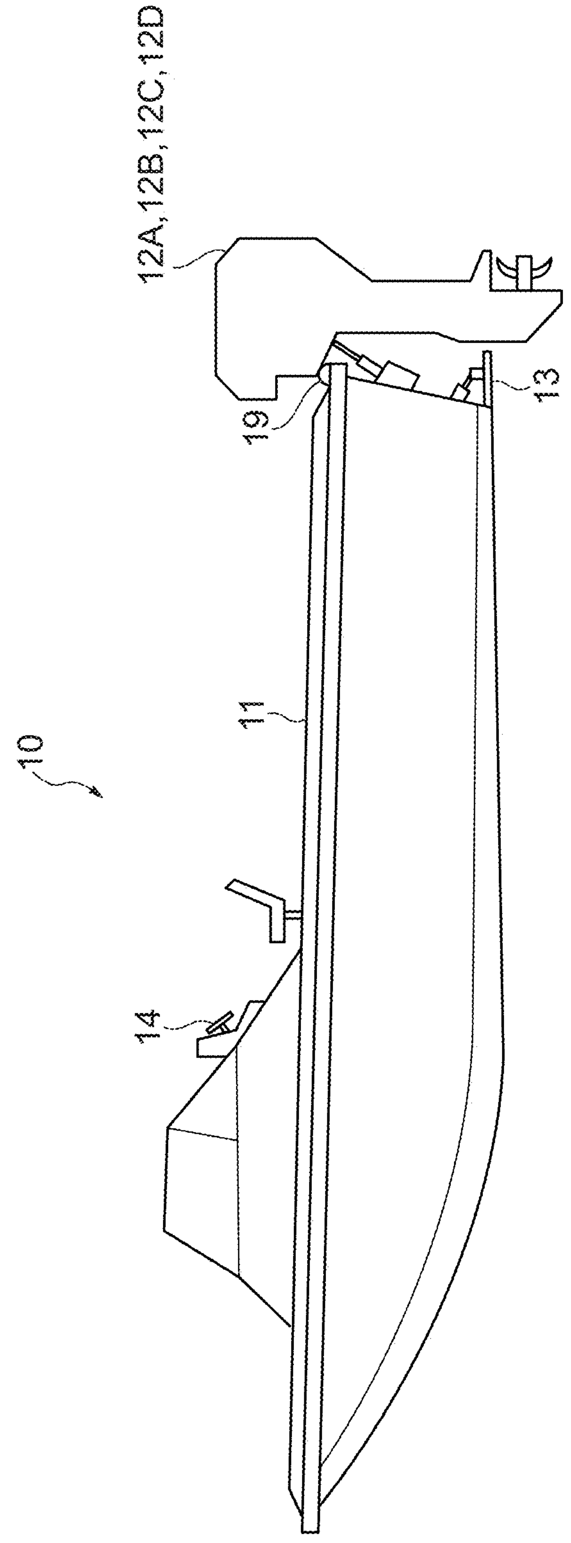
FIG. 1 is a side view of a marine vessel including a propulsion device.

FIG. 1 is a side view of a marine vessel including a propulsion device according to a preferred embodiment of the present invention. The marine vessel 10, which is, for example, a planing boat, includes a hull 11, a plurality of outboard motors 12A, 12B, 12C, and 12D as propulsion devices attached to the hull 11, and a plurality of trim tabs 13. The outboard motors 12A, 12B, 12C, and 12D are attached to the stern of the hull 11 side by side. Any number of outboard motors may be mounted on the hull 11. A steering wheel 14 is provided in the vicinity of a cockpit in the hull 11.

Each of the outboard motors 12A, 12B, 12C, and 12D is mounted on the hull 11 via a corresponding mounting unit 19, and mainly in response to operation of the steering wheel 14, turns around a substantially-vertical steering shaft in the corresponding mounting unit 19. Through this operation, the marine vessel is steered.

Figure 2:
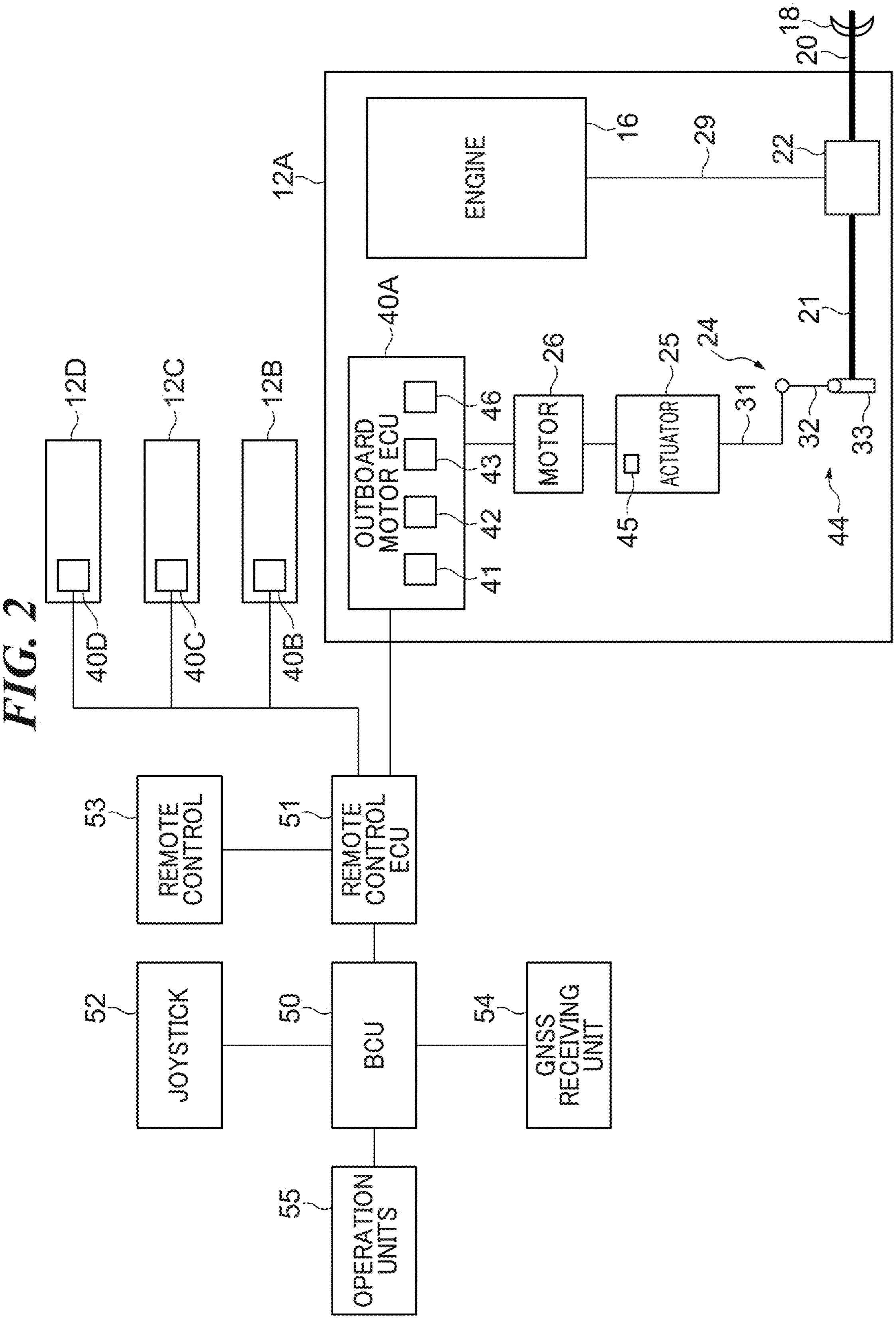
FIG. 2 is a block diagram illustrating a main configuration of the marine vessel.

FIG. 2 is a block diagram illustrating a main configuration of the marine vessel. As representative for the outboard motors 12A, 12B, 12C, and 12D, FIG. 2 specifically illustrates a control system of the outboard motor 12A relating to controlling transmission of a driving force from a drive source, and control systems relating to controlling the driving force from the drive source are omitted. The outboard motors 12A, 12B, 12C, and 12D include outboard motor ECUs (Electronic Controllers) 40A, 40B, 40C, and 40D, respectively. The outboard motors 12A, 12B, 12C, and 12D have the same configuration, and thus only the outboard motor 12A and the outboard motor ECU 40A will be described below as representative for the outboard motors and the outboard motor ECUs when there is no need to distinguish among the outboard motors 12A, 12B, 12C, and 12D.

The outboard motor 12A includes an engine 16, which is the drive source, a drive shaft 29 connected to the engine 16, a propeller shaft 20 to which a propeller 18 as a propulsive device is attached, and an axial shift slider 21 coupled to the propeller shaft 20. The engine 16 rotates the drive shaft 29 in a predetermined rotational direction, and the rotation is transmitted to the propeller shaft 20 via a forward/reverse shifting mechanism 44. The outboard motor 12A obtains a propulsive force from the propeller 18 turned by a driving force from the engine 16.

The outboard motor 12A further includes a clutch mechanism 22 that changes between transmission and non-transmission of the driving force from the engine 16 to the propeller shaft 20. The outboard motor 12A further includes a shift link mechanism 24 that moves the shift slider 21 in an axial direction, an actuator 25 that actuates the shift link mechanism 24, and an actuator motor 26 as an electric motor to drive the actuator 25. The forward/reverse shifting mechanism 44 includes the shift link mechanism 24 and the clutch mechanism 22 and changes the direction of the rotation transmitted from the drive shaft 29 to the propeller shaft 20 according to its shift position. As a result, the propeller 18 turns with the propeller shaft 20 in a forward direction or a reverse direction. That is, according to the shift position of the forward/reverse shifting mechanism 44, the direction of the propulsive force to be generated by the outboard motor 12A is changed to a forward direction or a reverse direction.

The forward/reverse shifting mechanism 44 is operable to change to a forward state (forward position) in which rotation in the forward direction is transmitted from the drive shaft 29 to the propeller shaft 20, or a reverse state (reverse position) in which rotation in the reverse direction is transmitted from the drive shaft 29 to the propeller shaft 20. The forward/reverse shifting mechanism 44 is further operable to change to a neutral state (neutral position) in which the transmission of rotation from the drive shaft 29 to the propeller shaft 20 is interrupted. Detailed description of the forward-reverse shifting mechanism 44 will be provided below with reference to FIGS. 3 to 5.

A BCU (Boat Controller Unit) 50, a remote control ECU 51, a joystick 52, a remote control 53, a GNSS receiving unit 54, and operation units 55 are provided in the hull 11. The BCU 50 is configured or programmed to control the entire marine vessel 10. The operation units 55 include a steering wheel 14, a setting operator, and a display unit. Operating signals from the operation units 55 are supplied to the BCU 50.

The remote control 53 is an operator that allows a vessel user to change its operation position from the neutral position to the forward direction or the reverse direction, in other words, to cause the shift position of the forward-reverse shifting mechanism 44 to change between the forward direction and the reverse direction via the neutral position. In a normal vessel operating mode, operating signals from the remote control 53 are supplied to the remote control ECU 51. The remote control ECU 51 is configured or programmed to output command signals indicating the operating amount and operating direction of the remote control 53 to the outboard motor ECUs 40A to 40D which require them. For example, the outboard motor ECU 40A controls the rotational speed of the engine 16 in the outboard motor 12A according to the amount of operation of the remote control 53 and controls the actuator 25 in the outboard motor 12A according to the operating direction of the remote control 53. In this way, the vessel speed of the marine vessel 10 is adjusted, and the travelling direction of the marine vessel 10 is changed to the forward or reverse direction.

The joystick 52 is an operator to intuitively steer the marine vessel 10. A vessel user is able to steer the marine vessel 10 with the joystick 52 only when the marine vessel 10 has shifted into a joystick mode. An operating signal from the joystick 52 is supplied to the BCU 50.

The joystick 52 is operable to be tilted back and forth and right and left and also twisted (pivoted) relative to its base portion. Based on operating signals from the operation units 55 and an operating signal from the joystick 52, the BCU 50 determines how to control the outboard motor ECUs 40A to 40D. Based on a result of the determination, the BCU 50 outputs to the outboard motor ECUs 40A to 40D signals to generate respective necessary propulsive forces and, as the need arises, signals to shift (change the shift positions of the respective forward/reverse shifting mechanisms 44) via the remote control ECU 51.

Accordingly, in the joystick mode, operating signals mainly based on vessel user's operations on the joystick 52 are supplied to the outboard motor ECUs 40A to 40D via the remote control ECU 51, which is different from the normal vessel operating mode. It should be noted that the operating signals include instructions to turn the outboard motors 12A, 12B, 12C, and 12D around their respective steering shafts. The outboard motors 12A, 12B, 12C, and 12D include their respective steering mechanism for this purpose (which are not illustrated). External steering units to turn the respective outboard motors 12A, 12B, 12C, and 12D around their steering shafts may be provided on the hull 11.

The GNSS receiving unit 54 includes a GNSS (Global Navigation Satellite System) receiver, like a GPS receiver, to receive a positioning signal from a positioning satellite, and able to receive a positioning signal like a GPS signal as positional information. The positional information received by the GNSS receiving unit 54 is supplied as positional information of the marine vessel 10 to the outboard motor ECUs 40A to 40D via the BCU 50 and the remote control ECU 51.

The outboard motor ECU 40A includes a first obtaining unit 41, a second obtaining unit 42, a determination unit 43, and a memory 46. Functions of the first obtaining unit 41, the second obtaining unit 42, and the determination unit 43 may be implemented by a CPU, a ROM, a RAM, a timer, etc., which are not illustrated, working in cooperation with one another. Control programs to be executed by the CPU are stored in the ROM. The memory 46 is a nonvolatile storage medium. A correction table (FIG. 6), which will be described below, is stored in the memory 46.

Figure 3:
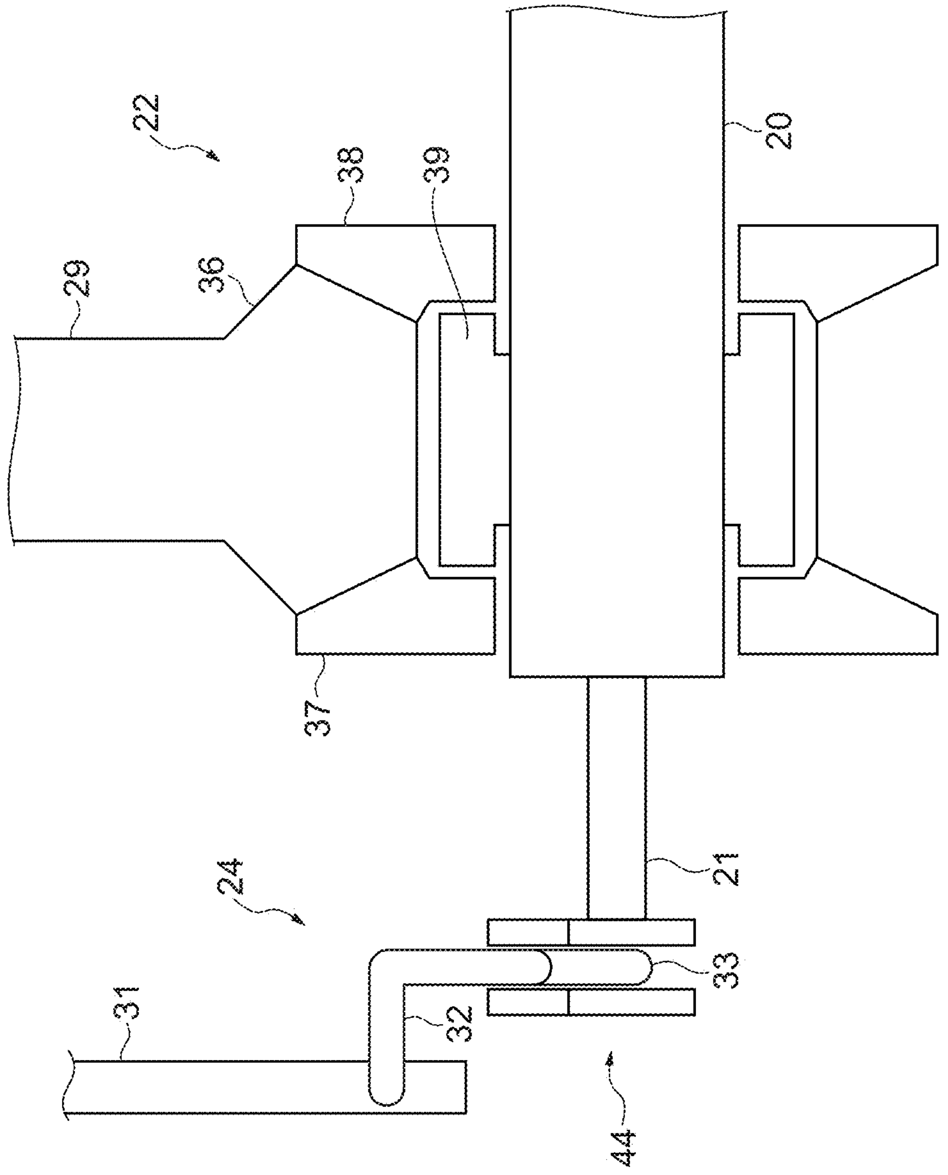
FIG. 3 is a partial enlarged schematic view useful in explaining a configuration of a forward/reverse shifting mechanism.
Figure 4:
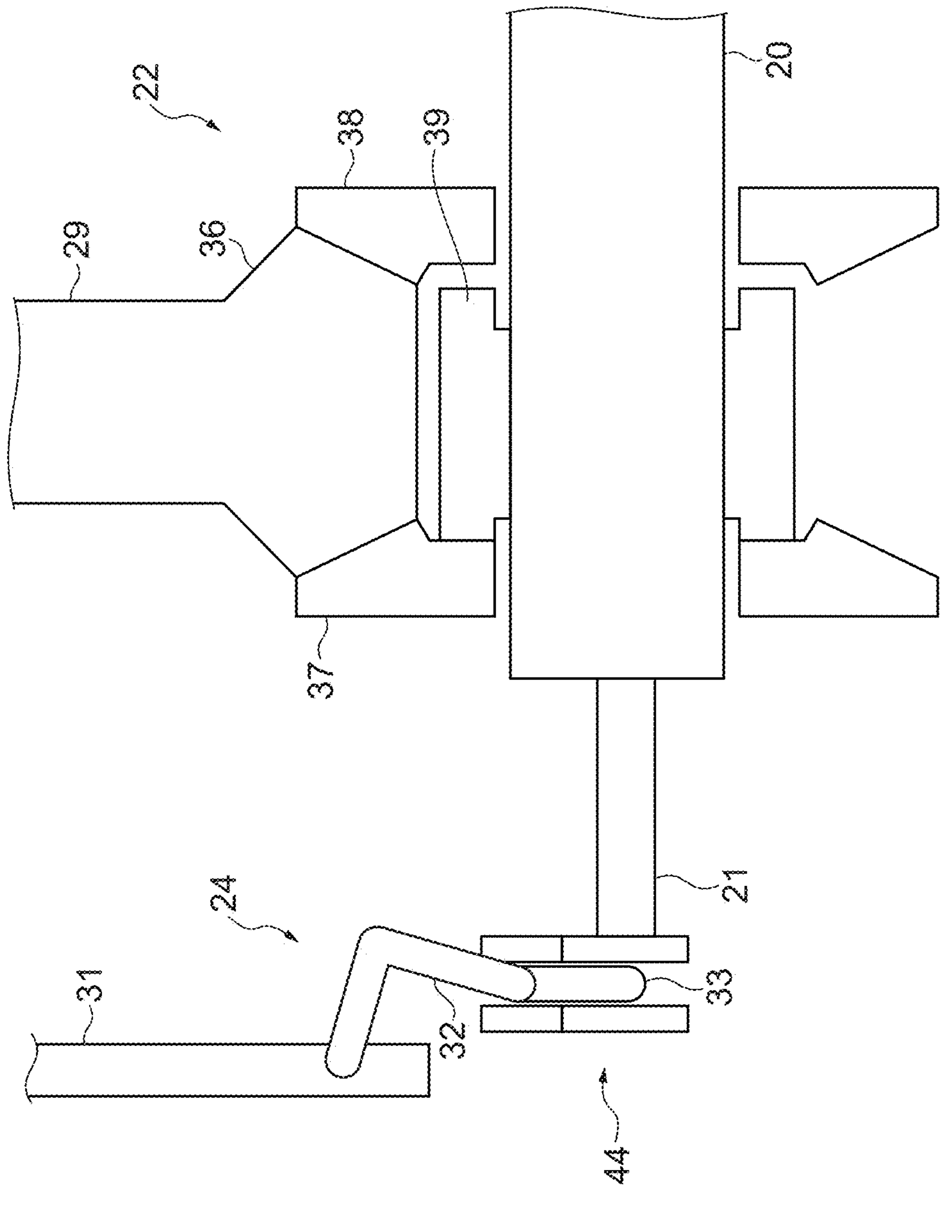
FIG. 4 is a partial enlarged schematic view useful in explaining the configuration of the forward/reverse shifting mechanism.
Figure 5:
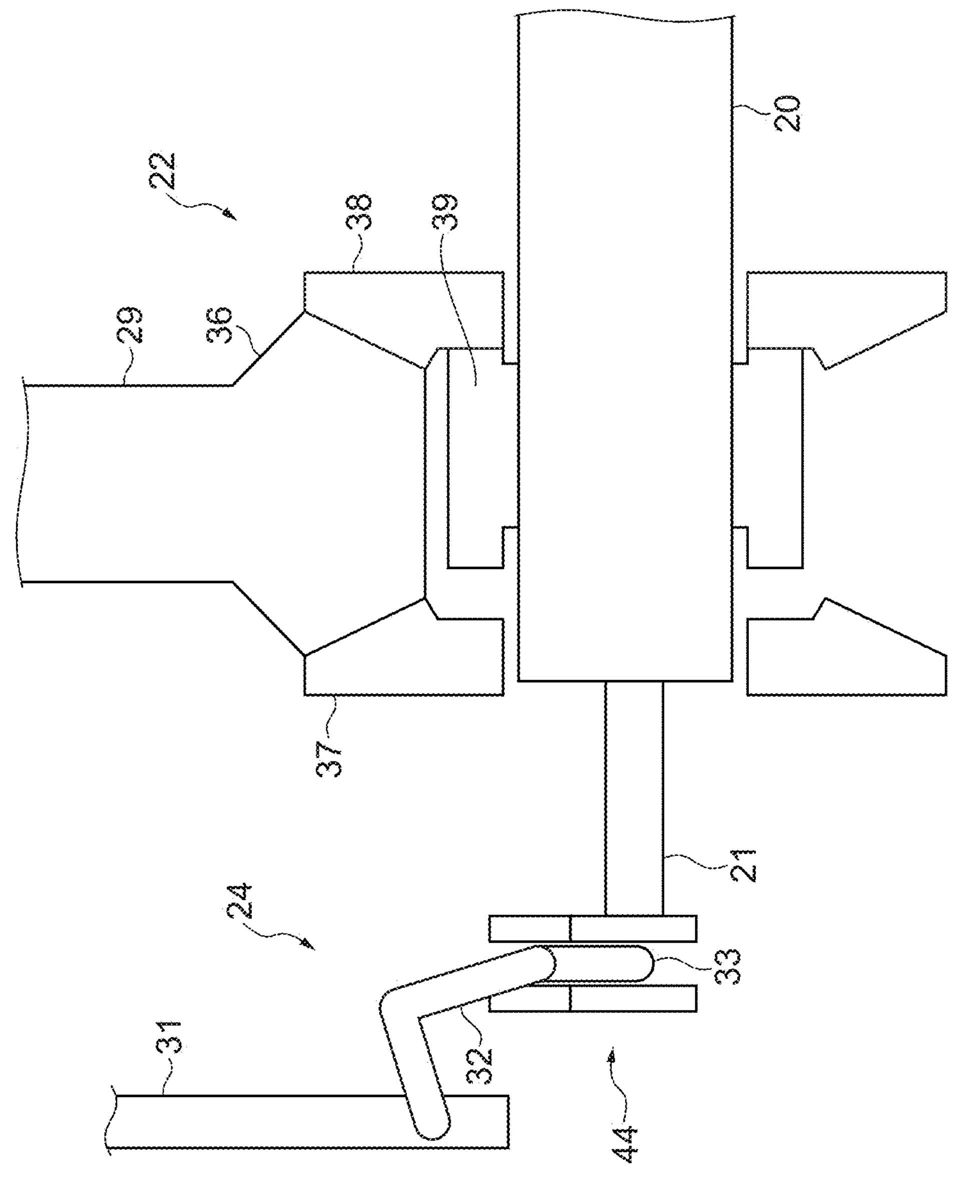
FIG. 5 is a partial enlarged schematic view useful in explaining the configuration of the forward/reverse shifting mechanism.

FIGS. 3 to 5 are partial enlarged schematic views useful in explaining a configuration of forward/reverse shifting mechanism 44.

The forward/reverse shifting mechanism 44 includes the shift link mechanism 24 and the clutch mechanism 22. The shift link mechanism 24 includes the shift slider 21, a shift rod 31, a link arm 32, and a pusher 33. The clutch mechanism 22 includes a driver gear 36, a forward driven gear 37, a reverse driven gear 38, and a dog clutch 39. The engine 16 and the clutch mechanism 22 are connected to each other by the drive shaft 29. The forward/reverse shifting mechanism 44 is operable to change the shift position by engaging the dog clutch 39 with one of the forward driven gear 37 and the reverse driven gear 38 and disengaging the dog clutch 39 from the other. The shift position is able to be changed between a forward shift position, at which the dog clutch 39 is engaged with the forward driven gear 37, and a reverse shift position, at which the dog clutch 39 is engaged with the reverse driven gear 38, via a neutral shift position, at which the dog clutch 39 is engaged with neither the forward driven gear 37 nor the reverse driven gear 38.

The actuator 25 is operable to move up and down the shift rod 31 using hydraulic pressure generated by operation of the actuator motor 26. It should be noted that the actuator 25 may be configured to mechanically convert the rotation of a shift motor to the vertical (upward and downward) movement of the shift rod 31 through a ball screw.

In the shift link mechanism 24, the shift rod 31 is connected to one end of the link arm 32, which is L-shaped, while a front end of the shift slider 21 is connected to the other end of the link arm 32 via the pusher 33. The link arm 32 is operable to move the shift slider 21 in the axial direction by converting the vertical movement of the shift rod 31 to the forward and backward movement of the pusher 33.

The clutch mechanism 22 includes a cylindrical dog clutch 39 as well as the drive gear 36, the forward driven gear 37, and the reverse driven gear 38, all of which are preferably bevel gears. The drive gear 36 is fixed to a lower end of the drive shaft 29 and rotates with the drive shaft 29. The forward driven gear 37 includes the propeller shaft 20. The reverse driven gear 38 faces the forward driven gear 37. The dog clutch 39 is between the forward driven gear 37 and the reverse driven gear 38 in the axial direction of the propeller shaft 20 (hereafter referred to merely as the axial direction).

The dog clutch 39 is a sleeve that includes the propeller shaft 20. A plurality of grooves extending in the axial direction are provided on an inner peripheral surface of the dog clutch 39, and the grooves are engaged with respective ones of a plurality of projections projecting from an outer periphery of the propeller shaft 20 and extending in the axial direction. As a result, the dog clutch 39 rotates with the propeller shaft 20 and also moves relatively to the propeller shaft 20 in the axial direction. A plurality of teeth are provided on a surface of the forward driven gear 37 which faces the dog clutch 39, and a plurality of teeth are also provided at an end (front end) of the dog clutch 39 which faces the forward driven gear 37. A plurality of teeth are provided on a surface of the reverse driven gear 38 which faces the dog clutch 39, and a plurality of teeth are also provided at an end (rear end) of the dog clutch 39 which faces the reverse driven gear 38. It should be noted that the dog clutch 39 is moved in the axial direction together with the shift slider 21 by the shift link mechanism 24 via an unillustrated mechanism.

In the clutch mechanism 22, both the forward driven gear 37 and the reverse driven gear 38 are constantly engaged with the drive gear 36 and rotated around the axis of the propeller shaft 20 by the drive gear 36. Since the forward driven gear 37 and the reverse driven gear 38 face each other across the drive gear 36, the forward driven gear 37 and the reverse driven gear 38 are rotated in the opposite directions.

The outboard motor 12A further includes unillustrated components such as a throttle actuator, a fuel supply device, a speed sensor to detect the rotational speed of the engine 16, and a starter motor as well as the components described above.

FIG. 3 illustrates a case where the shift position of the forward/reverse shifting mechanism 44 is the neutral position where no driving force from the engine 16 is transmitted to the propeller 18. In the neutral position, the shift rod 31 of the shift link mechanism 24 lies at an intermediate position within a range where the shift rod 31 is movable up and down. The shift slider 21 and the dog clutch 39 lie at an intermediate position in a range where they are movable in the axial direction such that the dog clutch 39 engages with neither the forward driven gear 37 nor the reverse driven gear 38.

FIG. 4 illustrates a case where the shift position of the forward/reverse shifting mechanism 44 is the forward position where a driving force from the engine 16 is transmitted to the propeller 18. In the forward position, the shift rod 31 of the shift link mechanism 24 moves upward. The shift slider 21 and the dog clutch 39 move forward in the axial direction (leftward as viewed in FIG. 4) such that the teeth at the front end of the dog clutch 39 engage with the teeth on the surface of the forward driven gear 37 which faces the front end of the dog clutch 39.

In this case, the driving force from the engine 16 is transmitted to the propeller shaft 20 via the drive shaft 29, the drive gear 36, the forward driven gear 37, and the dog clutch 39 to turn the propeller 18 in the forward direction. In the forward position, the marine vessel 10 is only able to move forward due to the propeller 18 turning in the forward direction.

FIG. 5 illustrates a case where the shift position of the forward/reverse shifting mechanism 44 is the reverse position where a driving force from the engine 16 is transmitted to the propeller 18. In the reverse position, the shift rod 31 of the shift link mechanism 24 moves downward. The shift slider 21 and the dog clutch 39 move backward in the axial direction (rightward as viewed in FIG. 5) such that the teeth at the rear end of the dog clutch 39 engage with the teeth on the surface of the reverse driven gear 38 which faces the rear end of the dog clutch 39.

In this case, the driving force from the engine 16 is transmitted to the propeller shaft 20 via the drive shaft 29, the drive gear 36, the reverse driven gear 38, and the dog clutch 39 to turn the propeller 18 in the reverse direction. In the reverse position, the marine vessel 10 is only able to move backward due to the propeller 18 turning in the reverse direction.

Command signals output from the remote ECU 51 (FIG. 2) to the outboard motor ECUs 40A to 40D are mainly based on a vessel user's operations on the joystick 52 or the remote control 53 and include shift requests and throttle requests. The shift request is a signal that requests changing of the shift position of the forward/reverse shifting mechanism 44 in one of the outboard motors 12A to 12D, which receives the shift request, to the neutral position, the forward position, or the reverse position. The throttle request is a signal that specifies a target intake airflow rate of the engine 16 in one of the outboard motors 12A to 12D, which receives the throttle request. The command signals are obtained by the first obtaining unit 41.

For example, in response to the shift request, the outboard motor ECU 40A sends to the actuator motor 26 an actuator drive signal which requests a drive amount of the actuator motor 26 corresponding to a shift amount indicated by the received shift request. The actuator motor 26 that has received the actuator drive signal runs the actuator 25 according to the requested drive amount.

In response to the throttle request, the outboard motor ECU 40A further sends to the throttle actuator a drive signal which corresponds to the received throttle request, and in response to this, the throttle actuator is operated.

As illustrated in FIG. 2, the actuator 25 includes a shift position sensor 45. The shift position sensor 45 detects a position of the shift rod 31 and sends the detected position as shift positional information to the outboard motor ECU 40A via the actuator motor 26. The outboard motor ECU 40A that has received the shift positional information controls the components of the outboard motor 12A so that the shift amount indicated by the shift positional information matches the shift amount indicated by the shift request.

The outboard motor ECUs 40A to 40D in the outboard motors 12A to 12D control the respective engines 16 and the respective forward/reverse shifting mechanisms 44 based on command signals which they receive. The contents of the command signals output from the remote control ECU 51 may differ among the outboard motors 12A to 12D. For example, when the marine vessel 10 is turning around or moving laterally, only some of the outboard motors 12A to 12D may be generating propulsive force, or the shift positions may differ among the outboard motors 12A to 12D. In the operation mode using the joystick, such conditions may frequently occur.

In a case where one of the outboard motors 12A to 12D which is kept in the neutral shift position receives a command that requests changing of the shift position to the forward or reverse position, a turning direction required for the propeller 18 is opposite to the direction in which the propeller 18 is currently turning together with a water current, and this puts a heavy load on the engine 16. In the present preferred embodiment, the outboard motor ECUs 40A to 40D in the respective outboard motors 12A to 12D are configured or programmed to perform a correction control (step S104 in FIG. 8, which will be described below) so as to prevent an engine stall in the above case. More specifically, one or more of the outboard motors 12A to 12D whose shift positions of the respective forward/reverse shifting mechanisms 44 are the neutral positions are subjected to the correction control.

In the correction control, the outboard motor ECUs 40A to 40D which function as controllers are each configured or programmed to increase the output of the corresponding engine 16 based on the sailing speed of the marine vessel 10 (hereafter referred to as the vessel speed V) when changing the shift position of the forward/reverse shifting mechanism 44 from the neutral position to a position corresponding to a direction opposite to a direction in which the marine vessel 10 is moving. In the control, the amount of increase in the output of the engine 16 is determined based on information indicating a relationship between the vessel speed V and the target output of the engine 16, and the vessel speed V obtained by the second obtaining unit 42, which will be described below.

Figure 6:
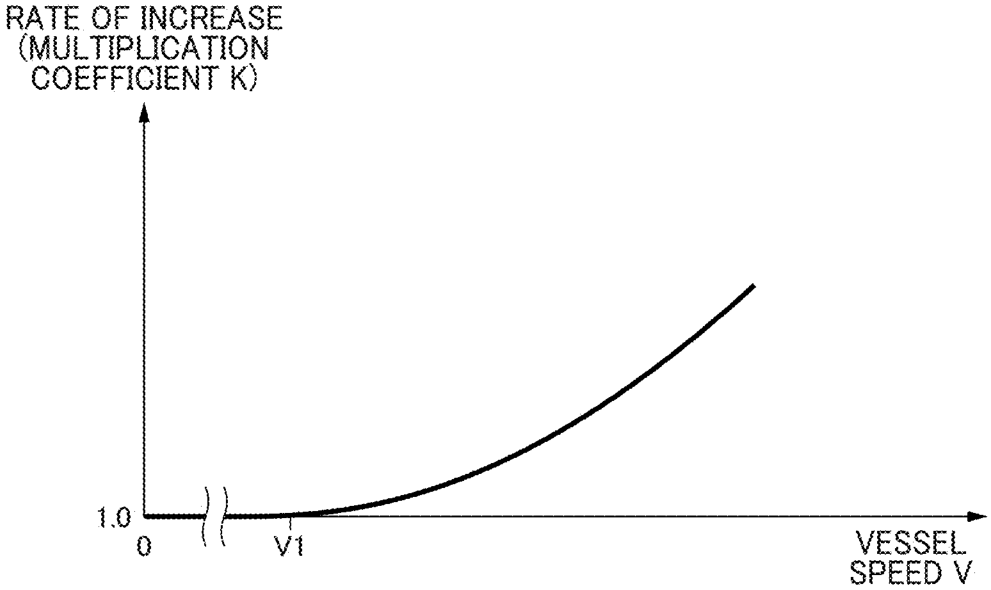
FIG. 6 is a view illustrating an example of a correction table.

FIG. 6 is a view illustrating an example of a correction table, which is information indicating the relationship between the vessel speed V and the value that represents the target output of the engine 16. The correction table is independently prepared for each of the outboard motors 12A to 12D in advance by experiments or the like and stored in the corresponding memory 46 in each of the outboard motors 12A to 12D. In the correction table, the horizontal axis represents the vessel speed V, and the vertical axis represents the rate of increase in intake airflow rate (multiplication coefficient K). The multiplication coefficient K, which is an example of the value that represents the target output of the engine 16, is a coefficient that represents the rate of increase by which a base intake airflow rate to keep the engine 16 idling is to be multiplied. Thus, the amount of increase in the output of the engine 16 is determined by the multiplication coefficient K depending on the vessel speed V. Each of the outboard motor ECUs 40A to 40D is configured or programmed to, in the correction control, set a target intake airflow rate at a value obtained by multiplying the base intake airflow rate by the multiplication coefficient K to increase the output of the corresponding engine 16 by an appropriate amount.

In the correction table, the multiplication coefficient K almost always increases with an increase in the vessel speed V. However, in an area where the vessel speed V is lower than a predetermined speed V1, the multiplication coefficient K is 1.0, and thus, the intake airflow rate does not increase.

In the present preferred embodiment, the speed of the marine vessel 10 itself is used as the vessel speed V. In other words, the vessel speed V is determined without using a method of estimating it from the rotational speed of the engine 16. The reason is that the vessel speed V determined by using such an estimation method is not always accurate. For example, in one of the outboard motors 12A to 12D whose shift position is the neutral position while the marine vessel 10 is sailing, the vessel speed V cannot be determined from the rotation of its engine 16.

Specifically, positional information on the marine vessel 10 which is received by the GNSS reciting unit 54, supplied via the remote control ECU 51, and received by the second obtaining unit 42 (FIG. 2) is used as the vessel speed V. The determination unit 43 determines the travelling direction of the marine vessel 10 from the vessel speed V obtained by the second obtaining unit 42.

Figure 7:
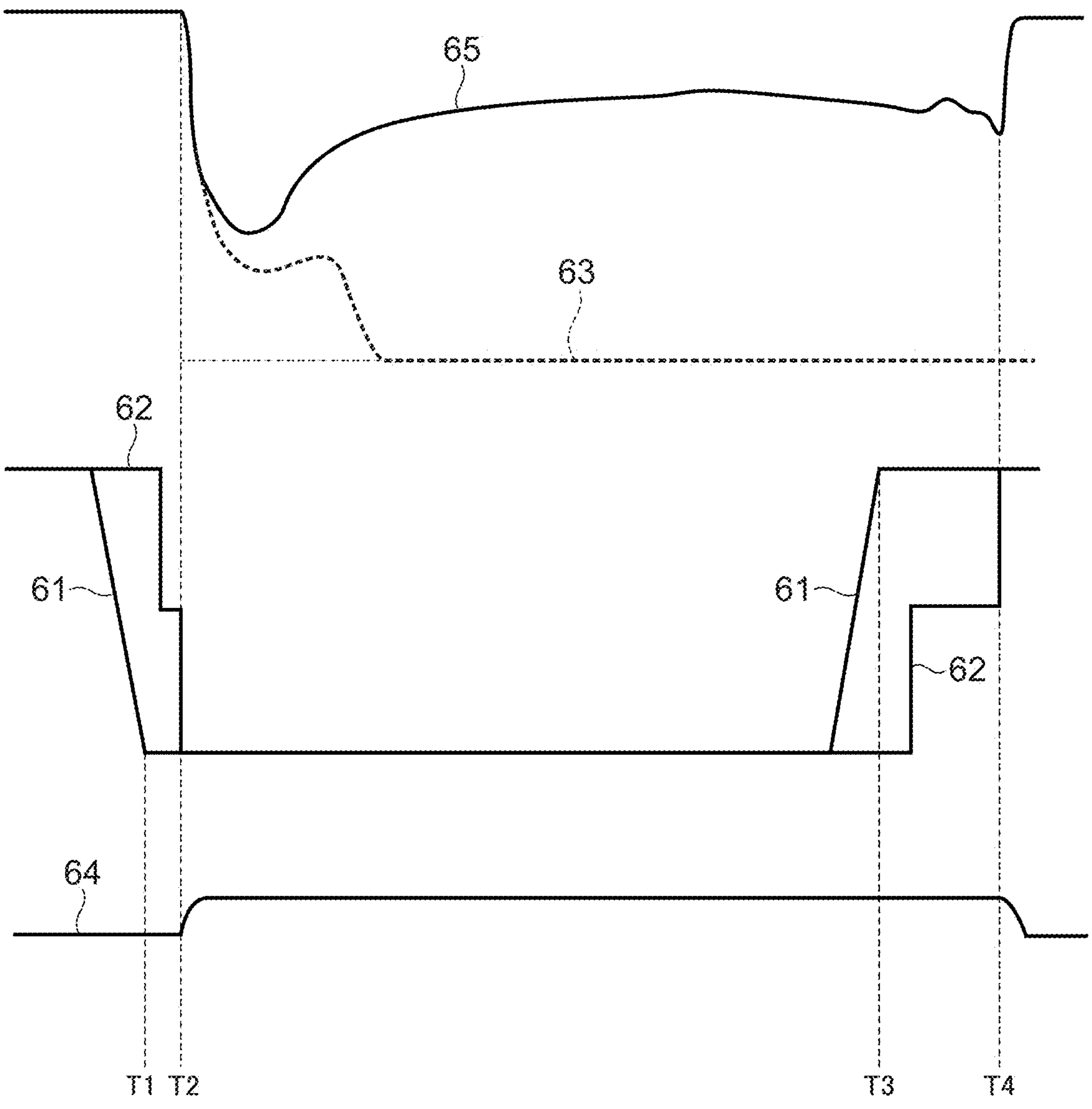
FIG. 7 is a timing chart illustrating transitions in shift position, intake airflow rate, and engine rotational speed during correction control.

FIG. 7 is a timing chart illustrating transitions in shift position, intake airflow rate, and engine rotational speed for one of the outboard motors 12A to 12D during the correction control performed by a corresponding one of the outboard motor ECUs 40A to 40D. The ship speed V is assumed to be constant at or above the predetermined speed V1. This timing chart illustrates transitions in shift request 61, present shift position 62, engine rotational speed 63, throttle opening 64, and engine rotational speed 65.

The engine rotational speed 65 represents the rotational speed of the engine 16 in the one of the outboard motors 12A to 12D. The present shift position 62 represents a present shift position (normalized position) in the forward/reverse shifting mechanism 44 detected by the shift position sensor 45 in the one of the outboard motors 12A to 12D. The shift request 61 is included in command signals output from the remote control ECU 51. The throttle opening 64 indicates the intake airflow rate of the engine 16. The engine rotational speed 63 represents the rotational speed of the engine 16 in a case where the correction control is not performed, which is provided as a comparative example.

When obtaining a shift request that requests changing of the shift position from the neutral position to a position corresponding to a direction opposite to the traveling direction of the marine vessel 10, the corresponding one of the outboard motor ECUs 40A to 40D performs the correction control. A time point T1 represents a time point at which the first obtaining unit 41 obtains (receives) a command signal that requests changing of the shift position from the neutral position to a position to one of the reverse position and the forward position which corresponds to a direction opposite to the traveling direction of the marine vessel 10 (shift request).

A time point T2 represents a time point at which the shift position sensor 45 detects that the shift position has changed to the position corresponding to the direction opposite to the traveling direction of the marine vessel 10 (shifted into the reverse or forward position). A time point 13 represents a time point at which the first obtaining unit 41 obtains (receives) a command signal that requests changing of the shift position to the neutral position (shift request). A time point T4 represents a time point at which the shift position sensor 45 detects that the shift position has changed from the reverse position or the forward position to the neutral position.

When the marine vessel 10 has shifted into the reverse position (or forward position) at the time point T2, the corresponding one of the outboard motor ECUs 40A to 40D starts the correction control to increase the throttle opening 64 and increase the intake airflow rate so as to increase the output of the engine 16. On this occasion, as described previously, the corresponding one of the outboard motor ECUs 40A to 40D obtains the multiplication coefficient K corresponding to the vessel speed V by referring to the correction table (FIG. 6) and sets the target intake airflow rate to a value obtained by multiplying the base intake airflow rate by the multiplication coefficient K. Then, the corresponding one of the outboard motor ECUs 40A to 40D control the throttle actuator so that the throttle opening 64 corresponding to the target intake airflow rate is achieved.

After that, when the time point 14 has come, the corresponding one of the outboard motor ECUs 40A to 40D ends the correction control. In other words, the corresponding one of the outboard motor ECUs 40A to 40D controls the throttle actuator so that the throttle opening 64 corresponding to the base intake airflow rate is achieved.

In the comparative example (engine rotational speed 63), when the shift position is changed from the neutral position to the forward position or the reverse position, the engine 16 is subjected to not only a shift shock but also a heavy load resulting from a water current causing the engine 16 to stop. On the other hand, in the present preferred embodiment, when the shift position is changed to a position corresponding to a direction opposite to the travelling direction of the marine vessel 10, the corresponding one of the outboard motor ECUs 40A to 40D increases the intake airflow rate which prevents a considerable decrease in the engine rotational speed 65. Specifically, the engine rotational speed 65 temporarily decreases due to the shift shock, but gradually returns toward the original speed without causing the engine 16 to stop.

Accordingly, an engine stall is able to be prevented when the shift position is changed from the neutral position to a position corresponding to a direction opposite to the travelling direction of the marine vessel 10.

Figure 8:
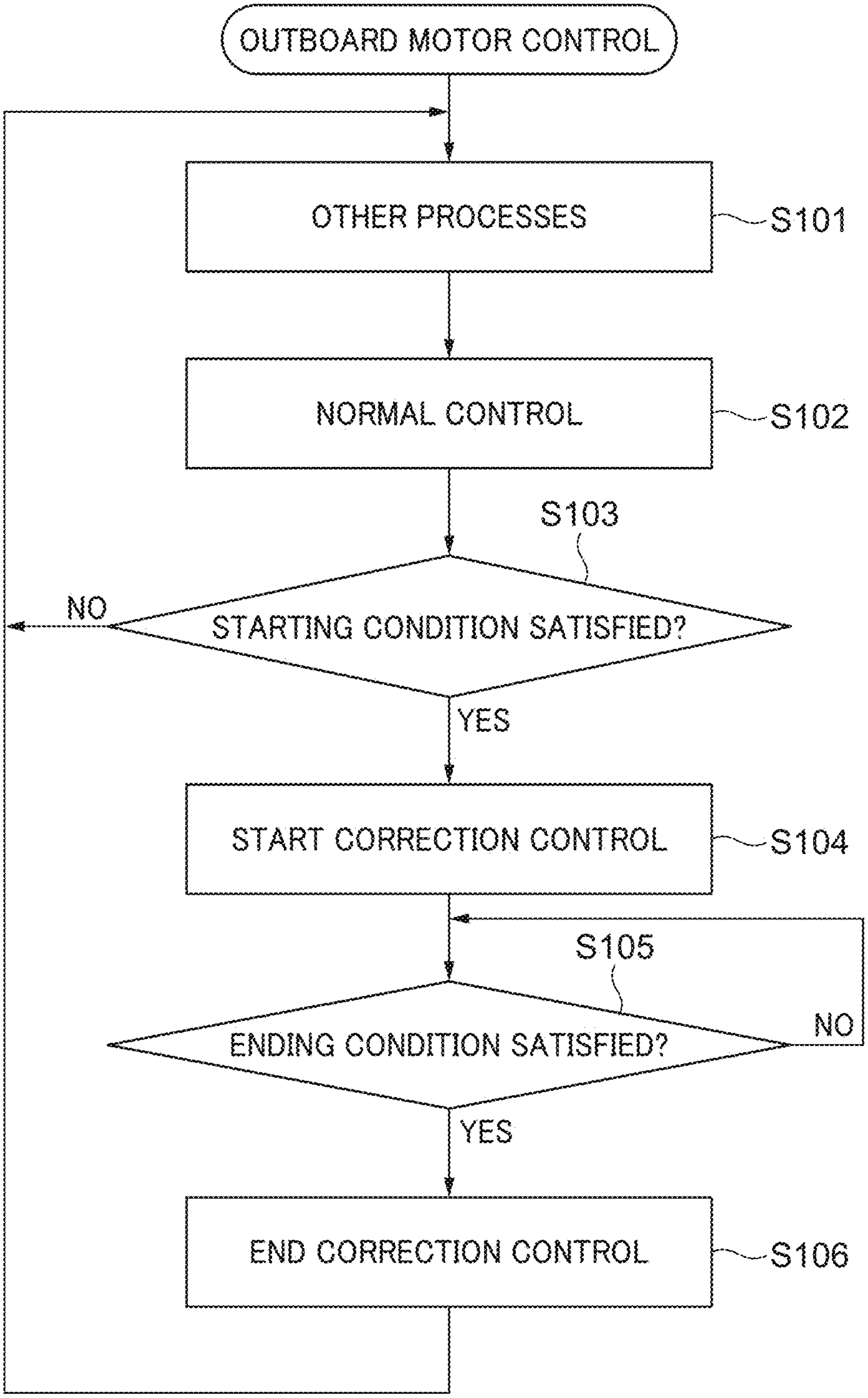
FIG. 8 is a flowchart illustrating an outboard motor control process.

FIG. 8 is a flowchart illustrating an outboard motor control process. The outboard motor control process is carried out by the outboard motor ECUs 40A to 40D of the respective outboard motors 12A to 12D in parallel. Here, a process that is carried out by the outboard motor ECU 40A of the outboard motor 12A is taken as an example. This process is implemented by the CPU in the outboard motor ECU 40A loading a program stored in the ROM and executing the same. This process is started when power is supplied to the outboard motor 12A.

In step S101, the outboard motor ECU 40A carries out control processes other than the normal control and the correction control. Here, the outboard motor ECU 40A performs control processes according to vessel user's operations on the operation units 55. For example, the outboard motor ECU 40A makes a setting or cancelation of the normal vessel operating mode, a setting or cancelation of the joystick mode, and a setting of use/not use of the correction control. When the correction control is set to not use, step S101 and step S102 are repeatedly executed without the steps following the step S103 being executed.

In the step S102, the outboard motor ECU 40A performs a normal control. In the normal control, based on command signals (a shift request, a throttle request, etc.) output from the remote control ECU 51, the outboard motor ECU 40A controls the shift position of the forward/reverse shifting mechanism 44 and also controls the engine 16. Thus, the actuator 25 and the throttle actuator are driven according to the command signals.

In the step S103, the outboard motor ECU 40A determines whether or not a starting condition to start the correction control is satisfied. That is, as described above, the outboard motor ECU 40A determines whether or not the shift position sensor 45 has detected changing of the shift position to a position corresponding to a direction opposite to the travelling direction of the marine vessel 10 (whether or not the time point T2 has come). When the outboard motor ECU 40A determines that the starting condition is not satisfied, the process returns to the step S101, and when the outboard motor ECU 40A determines that the starting condition is satisfied, it starts the correction control in step S104.

It should be noted that the starting condition for the correction control may be a condition that the time point T1 has come. In other words, the correction control may be started in response to the first obtaining unit 41 obtaining a command signal that requests changing the shift position to a position corresponding to a direction opposite to the travelling direction of the marine vessel 10. This accelerates the increase in intake airflow rate and thus improves the effect of preventing an engine stall.

In the correction control, as described above, the outboard motor ECU 40A uses the correction table (FIG. 6) to increase the intake airflow rate of the engine 16 based on the vessel speed V obtained by the second obtaining unit 42, and thus increases the output of the engine 16.

In step S105, the outboard motor ECU 40A stands by until an ending condition to end the correction control is satisfied. In other words, the outboard motor ECU 40A determines whether or not the shift position sensor 45 has detected changing of the shift position to the neutral position (whether or not the time point T4 has come) after changing of the shift position from the neutral position to a position corresponding to a direction opposite to the travelling direction of the marine vessel 10.

When the outboard motor ECU 40A determines that the ending condition is satisfied, the process proceeds to step S106, in which the outboard motor ECU 40A ends the correction control which it has performed, followed by the process returning to the step S101.

Here, according to the correction table (FIG. 6), when the vessel speed V becomes lower than the predetermined speed V1 ($V<V1$), the multiplication coefficient K becomes 1.0, which results in that the target intake airflow rate matches the base intake airflow rate. Thus, the control is substantially the same as the correction control being ended.

It should be noted that the ending condition for the correction control may be that $V<V1$ holds after changing of the shift position from the neutral position to a position corresponding to a direction opposite to the travelling direction of the marine vessel 10 or that the time point T4 has come. In this way, the correction control is ended even when $V<V1$ holds before the time point T4. According to the control, even if the vessel speed V is fluctuating bit by bit in the vicinity of the predetermined speed V1 before the time point T4, the intake airflow rate is prevented from frequently increasing and not increasing repeatedly.

It should be noted that the ending condition for the correction control may be that the time point T3 has come.

According to the present preferred embodiment, when changing the shift position of the forward/reverse shifting mechanism 44 from the neutral position to a position corresponding to a direction opposite to the travelling direction of the marine vessel 10, the outboard motor ECU 40A performs the correction control to increase the output of the engine 16 based on the vessel speed V. As a result, an engine stall is prevented when the shift positions are changed.

In particular, the outboard motor ECU 40A controls the intake airflow rate using the correction table indicating the relationship between the vessel speed V and the multiplication coefficient K. On this occasion, the vessel speed V is obtained based on a positioning signal obtained from a positioning satellite, and thus the air intake is increased by an appropriate amount corresponding to a load put on the engine 16 when the shift position is changed from the neutral position to a position corresponding to a direction opposite to the travelling direction of the marine vessel 10.

It should be noted that in the joystick mode, there are many cases where the different shift requests and throttle requests are issued to the outboard motors 12A, 12B, 12C, and 12D, and thus it is highly effective to perform the correction control based on command signals based on vessel user's operation on the joystick 52. However, the way to perform the correction control is not limited to this, but the effect of preventing an engine stall is achieved by performing the correction control based on a command signal based on vessel user's operation on the remote control 53.

In the present preferred embodiment, the vertical axis of the correction table (FIG. 6) represents the multiplication coefficient K, and the base intake airflow rate is multiplied by the multiplication coefficient K, which substantially corresponds to a calculation such that the base intake airflow rate is increased by a necessary intake airflow rate. The correction table, however, is not limited to this, but one illustrated in FIG. 9 may be used.

Figure 9:
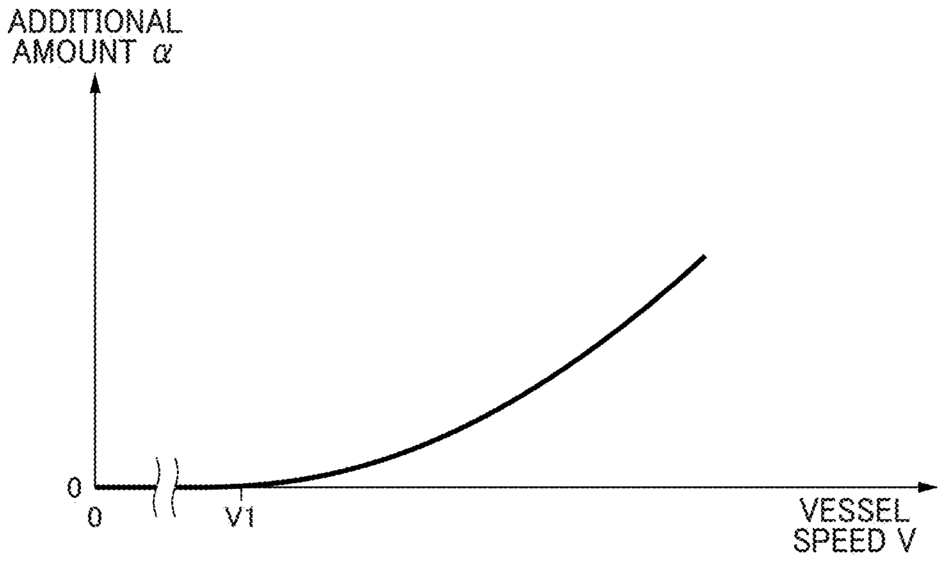
FIG. 9 is a view illustrating an example of the correction table.

FIG. 9 is a view illustrating a variation of the correction table. The vertical axis represents an additional amount α which should be added to the base intake airflow rate. The additional amount α is an example of the value that represents the target output of the engine 16.

In the correction control, by setting a target intake airflow rate to a value obtained by adding the additional amount α to the base intake airflow rate, the outboard motor ECU 40A increases the output of the engine 16 by an appropriate amount. In this correction table, the additional amount α almost always increases with an increase in the vessel speed V. However, in an area where the vessel speed V is lower than the predetermined speed V1, the additional amount α is zero, and thus the intake airflow rate does not increase.

Alternatively, a function that represents the relationship between the vessel speed V and the value that represents the target output of the engine 16 may be used instead of the correction table.

In the present preferred embodiment, the output of the engine is increased by increasing the intake airflow rate. However, other methods may be used to increase the output of the engine. For example, a method in which ignition timing of fuel or ignition timing of an ignition plug is controlled (advanced ignition) may be used.

The correction control is substantially performed on one or more of the outboard motors 12A to 12D whose shift positions of the respective forward/reverse shifting mechanisms 44 are the neutral positions. From this standpoint, the BCU 50 may integrally control the plurality of outboard motors 12A to 12D and perform the correction control described above on the outboard motors 12A to 12D. In other words, the BCU 50 as a controller may carry out the processes in the steps S104 to S106 on one or more of the outboard motors 12A to 12D for which the starting condition for the correction control is satisfied. Alternatively, the BCU 50 may instruct one or more of the outboard motors 12A to 12D for which the starting condition for the correction control is satisfied to carry out the processes in the steps S104 to S106.

Alternatively, a specific one (for example, the outboard motor 12A) of the outboard motors 12A to 12D may integrally control itself and the other outboard motors (for example, the outboard motors 12B, 12C, 12D) and perform the correction control described above on the outboard motors 12A to 12D.

The propulsion devices to which preferred embodiments of the present invention are applicable are not limited to outboard motors, but can be any propulsion device equipped with the forward/reverse shifting mechanism 44. Thus, preferred embodiments of the present invention are also applicable to inboard/outboard motors (stern drive, inboard motor/outboard drive) and inboard motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A propulsion device for a marine vessel, the propulsion device comprising:

an engine;

a forward/reverse shifting mechanism to change a direction of a propulsive force to be generated by the propulsion device according to a shift position thereof, the shift position being changeable between a forward position and a reverse position via a neutral position; and a controller configured or programmed to:

obtain a command signal based on an operation of a joystick provided in the marine vessel;

based on the obtained command signal, control the shift position of the forward/reverse shifting mechanism and control the engine;

obtain a speed of the marine vessel;

determine a travelling direction of the marine vessel based on the obtained speed of the marine vessel; and when changing the shift position of the forward/reverse shifting mechanism from the neutral position to a position corresponding to a direction opposite to the determined travelling direction of the marine vessel, perform a correction control to increase an output of the engine based on the obtained speed of the marine vessel.

2. The propulsion device according to claim 1, wherein the controller is configured or programmed to, in the correction control, determine an amount of increase in the output of the engine based on information indicating a relationship between a speed of the marine vessel and a value that represents a target output of the engine, and on the obtained speed of the marine vessel.

3. The propulsion device according to claim 1, wherein the controller is configured or programmed to perform the correction control by controlling an intake airflow rate of the engine.

4. The propulsion device according to claim 3, wherein the controller is configured or programmed to, in the correction control, increase the output of the engine by adding an amount corresponding to the obtained speed of the marine vessel to a base intake airflow rate to keep the engine idling.

5. The propulsion device according to claim 2, wherein the value that represents the target output of the engine is a coefficient that represents a rate of increase by which a base intake airflow rate to keep the engine idling is to be multiplied; and the controller is configured or programmed to perform the correction control by controlling an intake airflow rate of the engine and, in the correction control, increase the output of the engine by multiplying the base intake airflow rate by the coefficient corresponding to the obtained speed of the marine vessel.

6. The propulsion device according to claim 2, wherein the value that represents the target output of the engine is a coefficient that represents an additional amount to be added to a base intake airflow rate to keep the engine idling; and the controller is configured or programmed to perform the correction control by controlling an intake airflow rate of the engine and, in the correction control, increase the output of the engine by adding the additional amount corresponding to the obtained speed of the marine vessel to the base intake airflow rate.

7. The propulsion device according to claim 1, further comprising:

a sensor to detect the shift position; wherein the controller is configured or programmed to start performing the correction control in response to the sensor detecting changing of the shift position from the neutral position to the position corresponding to the direction opposite to the travelling direction.

8. The propulsion device according to claim 1, wherein the controller is configured or programmed to start the correction control in response to obtaining the command signal that requests changing of the shift position from the neutral position to the position corresponding to the direction opposite to the travelling direction.

9. The propulsion device according to claim 1, further comprising:

a sensor to detect the shift position; wherein the controller is configured or programmed to end the correction control in response to the sensor detecting changing of the shift position to the neutral position after changing of the shift position from the neutral position to the position corresponding to the direction opposite to the travelling direction.

10. The propulsion device according to claim 1, wherein the controller is configured or programmed to end the correction control when the obtained speed of the marine vessel becomes lower than a predetermined speed after changing of the shift position from the neutral position to the position corresponding to the direction opposite to the travelling direction.

11. The propulsion device according to claim 1, wherein the controller is configured or programmed to obtain the speed of the marine vessel based on a positioning signal obtained from a positioning satellite.

12. A marine vessel comprising:

a hull;

a joystick; and a propulsion device attached to the hull, the propulsion device including:

an engine;

a forward/reverse shifting mechanism to change a direction of a propulsive force to be generated by the propulsion device according to a shift position thereof, the shift position being changeable between a forward position and a reverse position via a neutral position; and a controller configured or programmed to:

obtain a command signal based on an operation of the joystick;

based on the obtained command signal, control the shift position of the forward/reverse shifting mechanism and control the engine;

obtain a speed of the marine vessel;

determine a travelling direction of the marine vessel based on the obtained speed of the marine vessel; and when changing the shift position of the forward/reverse shifting mechanism from the neutral position to a position corresponding to a direction opposite to the determined travelling direction of the marine vessel, perform a correction control to increase an output of the engine based on the obtained speed of the marine vessel.

13. A marine vessel comprising:

a hull;

an operator;

a propulsion device attached to the hull and including an engine and a forward/reverse shifting mechanism to change a direction of a propulsive force to be generated by the propulsion device according to a shift position thereof, the shift position being changeable between a forward position and a reverse position via a neutral position; and a controller configured or programmed to:

obtain a command signal based on an operation of the operator;

based on the obtained command signal, control the shift position of the forward/reverse shifting mechanism and control the engine;

obtain a speed of the marine vessel;

determine a travelling direction of the marine vessel based on the obtained speed of the marine vessel; and when changing the shift position of the forward/reverse shifting mechanism from the neutral position to a position corresponding to a direction opposite to the determined travelling direction of the marine vessel, perform a correction control to increase an output of the engine based on the obtained speed of the marine vessel.

14. A marine vessel comprising:

a hull;

an operator;

a plurality of propulsion devices attached to the hull, each of the propulsion devices including an engine and a forward/reverse shifting mechanism to change a direction of a propulsive force generated by the each of the plurality of propulsion devices according to a shift position thereof, the shift position being changeable between a forward position and a reverse position via a neutral position; and a controller configured or programmed to:

obtain a command signal based on an operation of the operator;

based on the obtained command signal, control the shift positions of the forward/reverse shifting mechanisms of the plurality of propulsion devices and the engines of the plurality of propulsion devices;

obtain a speed of the marine vessel;

determine a travelling direction of the marine vessel based on the obtained speed of the marine vessel; and perform a correction control on one or more propulsion devices whose shift positions of the respective forward/reverse shifting mechanisms are the neutral positions among the plurality of propulsion devices; wherein in the correction control, the controller is configured or programmed to increase outputs of the engines of the one or more propulsion devices based on the obtained speed of the marine vessel when changing the shift positions of the respective forward/reverse shifting mechanisms from the neutral positions to respective positions corresponding to a direction opposite to the determined travelling direction of the marine vessel.

* * * * *